US012750297B1

(12) United States Patent
Asulin et al.

(10) Patent No.: US 12,750,297 B1
(45) Date of Patent: Sep. 29, 2026

(54) ENHANCED MAXIMUM TRANSMISSION UNIT (MTU) DISCOVERY

(71) Applicant: HEWLETT PACKARD ENTERPRISE DEVELOPMENT LP, Spring, TX (US)

(72) Inventors: Bar-Hai Asulin, Herzliya (IL); Gil Barash, Herzliya (IL); Shlomi Apel, Herzliya (IL)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 19/181,871

(22) Filed: Apr. 17, 2025

(51) Int. Cl.
*G06F 15/16* (2006.01)
*H04L 43/12* (2022.01)
*H04L 47/36* (2022.01)

(52) U.S. Cl.
CPC .............. *H04L 43/12* (2013.01); *H04L 47/36* (2013.01)

(58) Field of Classification Search
CPC ................................ H04L 43/12; H04L 47/36
USPC .......................................................... 709/224
See application file for complete search history.

(56) References Cited

U.S. PATENT DOCUMENTS

| | | | | |
|---|---|---|---|---|
| 8,984,158 B2 * | 3/2015 | Karkkainen | H04L 65/4015 | 709/233 |
| 9,413,797 B2 * | 8/2016 | Kärkkäinen | H04N 21/643 | |
| 9,503,384 B1 * | 11/2016 | Oliveira, V | H04L 43/0882 | |
| 10,541,899 B2 * | 1/2020 | Xue | H04L 43/10 | |
| 11,477,106 B2 * | 10/2022 | Xue | H04L 43/10 | |
| 11,777,865 B2 * | 10/2023 | Momchilov | H04L 43/10 | 370/235 |
| 11,784,912 B2 * | 10/2023 | Ehrat | H04L 45/121 | |
| 11,895,009 B2 * | 2/2024 | Ehrat | H04L 45/121 | |
| 11,930,069 B1 * | 3/2024 | Parla | H04L 67/02 | |
| 12,261,901 B2 * | 3/2025 | Parla | H04L 67/02 | |
| 2015/0189008 A1 * | 7/2015 | Karkkainen | H04N 7/15 | 709/204 |
| 2018/0205629 A1 * | 7/2018 | Xue | H04L 43/10 | |
| 2020/0204472 A1 * | 6/2020 | Xue | H04L 43/10 | |
| 2020/0366592 A1 * | 11/2020 | Ehrat | H04L 45/121 | |

(Continued)

OTHER PUBLICATIONS

Fairhurst, G. et al., "Packetization Layer Path MTU Discovery for Datagram Transports," RFC 8899, Section 5.1.4, Sep. 2020, 37 pages.

(Continued)

*Primary Examiner* — Moustafa M Meky
(74) *Attorney, Agent, or Firm* — Hewlett Packard Enterprise Patent Department

(57) ABSTRACT

Responsive to receiving a first uptime identifier from a server device, a client device may transmit a probe packet to the server device via a socket. The probe packet may have a size and may include a request for an uptime identifier. The client device may receive a response to the probe packet from the server device via the socket. The response may indicate that the probe packet was successfully received at the server device and may include a second uptime identifier. The client device may store the size as a maximum transmission unit (MTU) setting of the socket responsive to determining that the first uptime identifier and the second uptime identifier identify an uninterrupted uptime of the server device. The client device may transmit, via the socket, a data packet to the server device using the MTU setting.

20 Claims, 7 Drawing Sheets

(56) References Cited

U.S. PATENT DOCUMENTS

| | | | | |
|---|---|---|---|---|
| 2023/0134974 | A1* | 5/2023 | Ehrat | H04L 45/121<br>709/238 |
| 2024/0291883 | A1* | 8/2024 | Parla | H04L 67/02 |
| 2024/0317173 | A1* | 9/2024 | Fiedler | B60P 3/36 |
| 2025/0365247 | A1* | 11/2025 | Jha | H04L 47/43 |

OTHER PUBLICATIONS

Reddit, "Does PMTUD Really Exist?", available online at <https://www.reddit.com/r/networking/comments/dx9jy0/does_pmtud_really_exist/>, Feb. 11, 2025, 7 pages.

Reddit, "Why Do I Need to Manually Adjust the MTU and MSS When Using GRE Tunnels if Cisco Devices (and Likely Other TCP/IP Devices) Automatically Use Path MTU Discovery (PMTUD)?" retrieved online at <https://www.reddit.com/r/networking/comm.>, Feb. 11, 2025, 6 pages.

Wikipedia, "Internet Control Message Protocol", available online at <https://en.wikipedia.org/w/index.php?title=Internet_Control_Message_Protocol&oldid=1265867140>, Dec. 29, 2024, 8 pages.

Wikipedia, "Maximum Segment Size", available online at <https://en.wikipedia.org/wiki/Maximum_segment_size>, Nov. 9, 2024, 3 pages.

Wikipedia, "Maximum Transmission Unit", available online at <https://en.wikipedia.org/w/index.php?title=Maximum_transmission_unit&oldid=1274244366>, Feb. 6, 2025, 7 pages.

Wikipedia, "Path MTU Discovery", available online at <https://en.wikipedia.org/w/index.php?title=Path_MTU_Discovery&oldid=1216167537>, Mar. 29, 2024, 3 pages.

* cited by examiner

ENHANCED MAXIMUM TRANSMISSION UNIT (MTU) DISCOVERY

BACKGROUND

Modern network environments include diverse and complex network topologies. As a result, data communicated from a source node to different destination nodes may traverse network paths with varying properties. For example, network paths may include varying numbers and combinations of components, such as intermediary devices (e.g., network switches, routers, gateways, and the like), virtual private networks (VPNs), and the like.

BRIEF DESCRIPTION OF THE DRAWINGS

Some implementations of the present disclosure are described with respect to the following figures.

Figure 1:
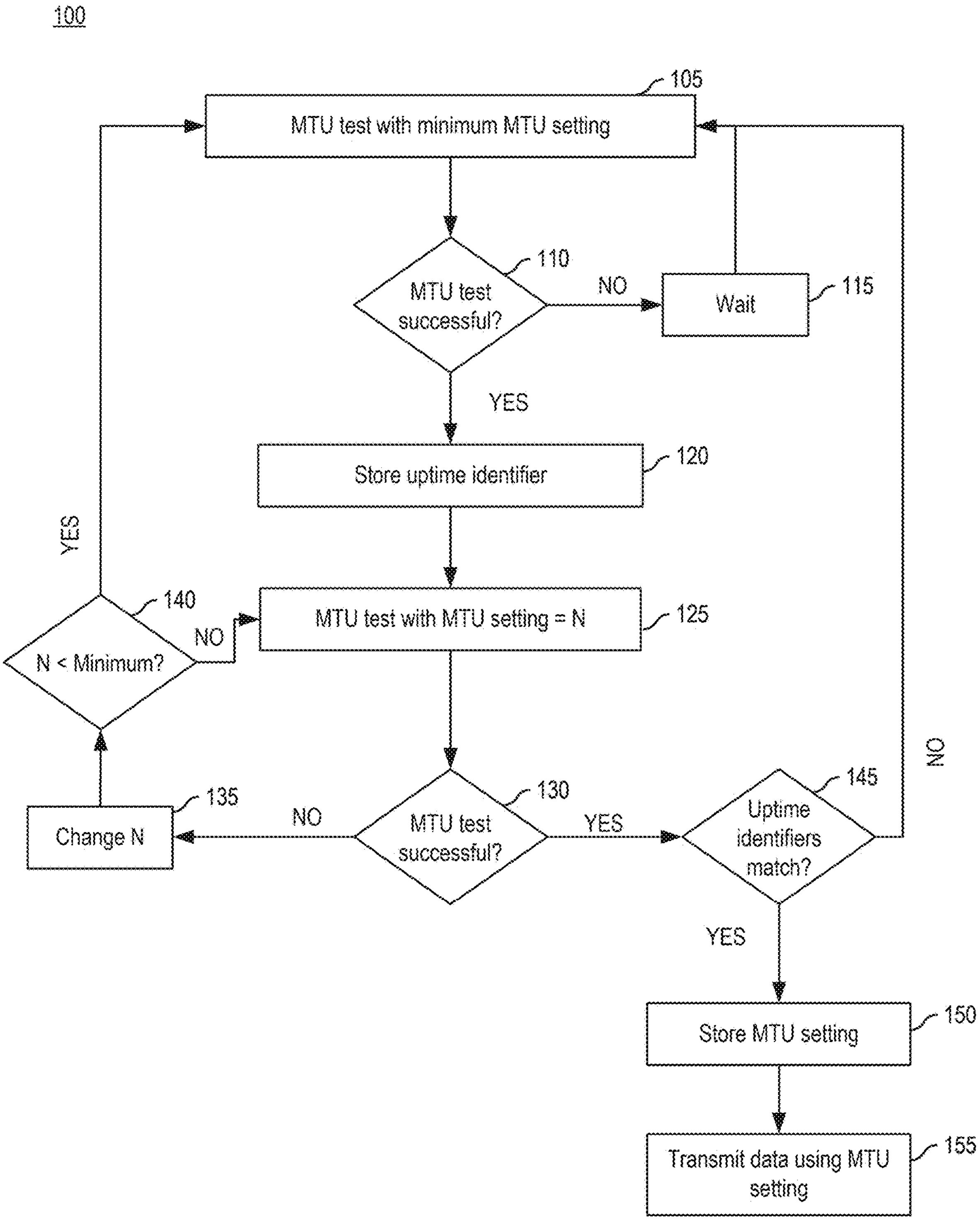
FIG. 1 is a flow diagram of a process for enhanced discovery of an MTU setting, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Devices in a network path may be configured with different maximum transmission unit (MTU) settings, limiting the maximum data packet size allowed to be communicated by a respective device. Differences in MTU settings (e.g., MTU mismatch) between devices in a network path may result in packet loss or packet fragmentation. For instance, a data packet transmitted by a source node using a first MTU setting may be dropped by an intermediary device having a second, smaller MTU setting.

Maximizing the MTU setting used to transmit packets between a source and a destination node may increase the efficiency of communication between these nodes, as higher MTU setting sizes may enable transmitting information using packets with larger sizes. However, discovering a maximized (e.g., optimal) MTU setting may be complicated by issues in the network and/or at the destination node. For instance, to discover an MTU setting suitable for communication with a destination node, a source node may test an MTU setting, which may involve attempting to transmit a packet (e.g., a probe packet) to the destination node using the MTU setting. In some cases, if this packet is dropped, the tested MTU setting may be considered unsuitable for communication with the destination node, and the source node may continue searching for a suitable MTU setting by lowering or otherwise changing the MTU setting to be tested.

Yet, a packet may be dropped due to a variety of issues, such as MTU mismatch, the destination node experiencing downtime, a failure of the network connecting the source and destination node, or the like. In this regard, in cases where the packet was dropped due to issues independent of the MTU setting (e.g., due to an issue with the network and/or destination node), treating a tested MTU setting as unsuitable and continuing the search may result in an MTU setting that is lower than a size supported by the network path. As a result, the source node may use a suboptimal MTU setting, which may reduce the efficiency of its communication with the destination node.

In some cases, Path MTU Discovery (PMTUD) may be used to determine an MTU setting for a source node. With PMTUD, when a source node may attempt to transmit a packet of a given size. Intermediary device(s) forwarding the packet and having an MTU setting smaller than the given size may drop the packet and transmit an Internet Control Message Protocol (ICMP) error message to the source node, which may signal that the MTU setting for the source node should be reduced. However, the usefulness of PMTUD is limited for several reasons. First, PMTUD relies on ICMP messages being allowed by all devices in a network path, yet ICMP messages are commonly blocked by network devices for security purposes. Second, PMTUD may fail on network paths involving a dynamic network address translation (NAT) device, such as a router employing dynamic NAT. Because PMTUD works on the internet layer (e.g., using ICMP), for example, the PMTUD may identify an MTU setting suitable for transmission only up to the dynamic NAT device. Beyond the dynamic NAT device, however, a data packet may traverse a path unique to its destination port, and this path may include multiple other network devices having various MTU settings. Third, PMTUD fails to account for virtual private network (VPN) practices that have additional internet protocol (IP) headers. Adding an IP header to a data packet for transmission through a VPN, for example, may cause the data packet to exceed the MTU setting of another device in a network path. Last, packet fragmentation is not permitted in PMTUD (e.g., PMTUD sets a "Don't Fragment (DF)" flag), which may result in inefficient MTU settings and may reduce flexibility in a network.

To address these issues, examples described herein relate to enhanced discovery of an MTU setting for a connection between a client device (e.g., a source node) and a server device (e.g., a destination node). The enhanced discovery may involve a client device testing an MTU setting by transmitting a probe packet to a server device in response to receiving a first uptime identifier from the server device. The probe packet may have a size and may include a request for an uptime identifier. The enhanced discovery may further involve the client device receiving a response to the probe packet from the server device. The response may indicate that the probe packet was successfully received at the server device and may include a second uptime identifier, which may be provided by the server device in response to the request for the uptime identifier. The client device may store the size of the probe packet as an MTU setting of the socket responsive to determining that the first uptime identifier and the second uptime identifier identify an uninterrupted uptime of the server device. The client device may further transmit, via the socket, a data packet to the server device using the MTU setting.

By using uptime identifiers in performing the enhanced discovery, the client device may verify whether the server device is experiencing uptime (e.g., is powered on, is operational, or the like) at one or more points. An uptime identifier (e.g., a token) may be a number, string, and/or the like that identifies an uptime period of the server device and may be generated by the server device. An uptime identifier may remain static during an uptime of the server device and may be changed (e.g., refreshed) when the server device experiences downtime (e.g., is powered off, restarts, is not operational, or the like). Accordingly, the client device may use an uptime identifier to verify that the server device is contactable via a network, which may indicate that the server device is experiencing uptime and that the network is operational. The client device may further use (e.g., compare) a set of uptime identifiers to verify that the server device experienced uninterrupted uptime between transmission of the set.

In some examples, if the server device is not contactable, the client device may wait for the server device to become contactable. In this regard, the client device may wait for the server device to become contactable, which may be indicated by receipt of the first uptime identifier, to transmit the probe packet. The client device may further use (e.g., compare) the first uptime identifier and the second uptime identifier received from the server device to determine whether the server device experienced uninterrupted uptime or experienced downtime while the client device tested the MTU setting associated with the probe packet. A match between the first uptime identifier and the second uptime identifier may, for example, indicate that the server device experienced uninterrupted uptime, while a mismatch between the first uptime identifier and the second uptime identifier may indicate that the server device experienced interrupted uptime (e.g., experienced downtime).

Based on determining that the server device experienced interrupted uptime, the client device may determine that failed or disrupted communication with the server device resulted from an issue independent of the MTU setting (e.g., an issue at the server device). In cases where the server device experienced interrupted uptime, the client device may re-verify that the server device is contactable and may restart and/or repeat a portion of the process to discover the MTU setting. By verifying whether the server device is experiencing uptime at various points, the client device may thus prevent the MTU setting size discovered for the connection from being lowered beyond a size supported by the network path. Accordingly, the enhanced discovery described herein may provide a superior MTU setting (e.g., an MTU setting with a greater size) beyond that which may be provided by alternative MTU discovery techniques.

The enhanced discovery described herein may further relate to connection-based discovery. As described herein, a connection may be a channel (e.g., link) that enables interprocess communication over a network (e.g., via a network path) from a source to a destination address and port. A socket may be an endpoint for the connection and may accordingly include a socket address that is a combination of a network destination address and a port number. Communicating via a socket or socket-like interface (which has a network destination address and a port number and may be referred to interchangeably as a socket) may involve using the transport layer, whether directly (e.g., using a transport layer protocol, such as transmission control protocol (TCP), user datagram protocol (UDP), or the like) or indirectly (e.g., using higher-level layer, such as the application layer, that uses the transport layer for communication).

Thus, transmitting the probe packet via the socket may involve transmitting the probe packet using the transport layer. In some examples, the client device may further transmit the probe packet to another socket at the server device such that the probe packet is transmitted to a network destination address and a port number at the server device. Responsive to receiving the probe packet, the server device may transmit the response to the client device. The client device may receive the response via the socket, which may again involve using the transport layer. The client device may use the response to determine whether the probe packet was successfully received at the server device, and successful receipt of the probe packet may indicate that the MTU setting corresponding to the given size is supported by the connection between the client device and server device.

By using the transport layer (e.g., using the socket), the MTU setting may be discovered without using ICMP messages, reducing the risk that information related to the MTU setting discovery is blocked by network devices for security purposes. Further, by using the transport layer in the manner described herein, the client device may discover an MTU setting suitable for end-to-end connection between the client device and the server device regardless of packet fragmentation and/or the components, such as dynamic NAT device, a VPN, or the like, included in the network path. In this regard, the client device may determine the MTU setting based on successfully transmitting a probe packet and receiving a corresponding response while remaining agnostic to packet fragmentation and/or the components in the network path used to do so.

FIG. 1 is a flow diagram of a process 100 for enhanced discovery of an MTU setting for a socket associated with a connection between a client device and a server device, according to some examples. Process 100 may be implemented in the form of executable instructions stored on a machine-readable storage medium (e.g., machine-readable storage medium 620 of FIG. 6, machine-readable storage medium 700 of FIG. 7, or the like) and/or in the form of electronic circuitry. In some examples, operations of the process 100 may be performed by the client device (e.g., client device 205 of FIG. 2, client device 405 of FIG. 4, computing device 600 of FIG. 6, or the like), which may be a computing device, by executing the instructions. Although FIG. 1 shows tasks performed in a given order, the tasks may be performed in a different order, some tasks may be omitted, and other tasks may be added.

As described herein, the client device may use the process 100 to discover an MTU setting for the connection with the server device that is suitable for communication with the server device (e.g., supported by the connection). In particular, the client device may discover an MTU setting for a socket associated with the connection. The client device may further use the process 100 to maximize the value of the discovered MTU setting. For instance, the process 100 may involve verifying whether the server device is experiencing uptime to avoid lowering the size of the MTU setting below a size supported by the connection.

In some examples, the client device may (at 105) perform an MTU test with a minimum MTU setting and may (at 110) determine whether the MTU test with the minimum MTU setting was successful. The minimum MTU setting may be a minimum size of the MTU setting, which may be defined by a network protocol used for the connection between the client device and the server device, such as internet protocol version 4 (IPv4), internet protocol version 6 (IPv6), or the like. As an illustrative example, the minimum MTU setting under IPv4 may be 576 bytes (e.g., octets), while the minimum MTU setting under IPV6 may be 1280 bytes.

Figure 2:
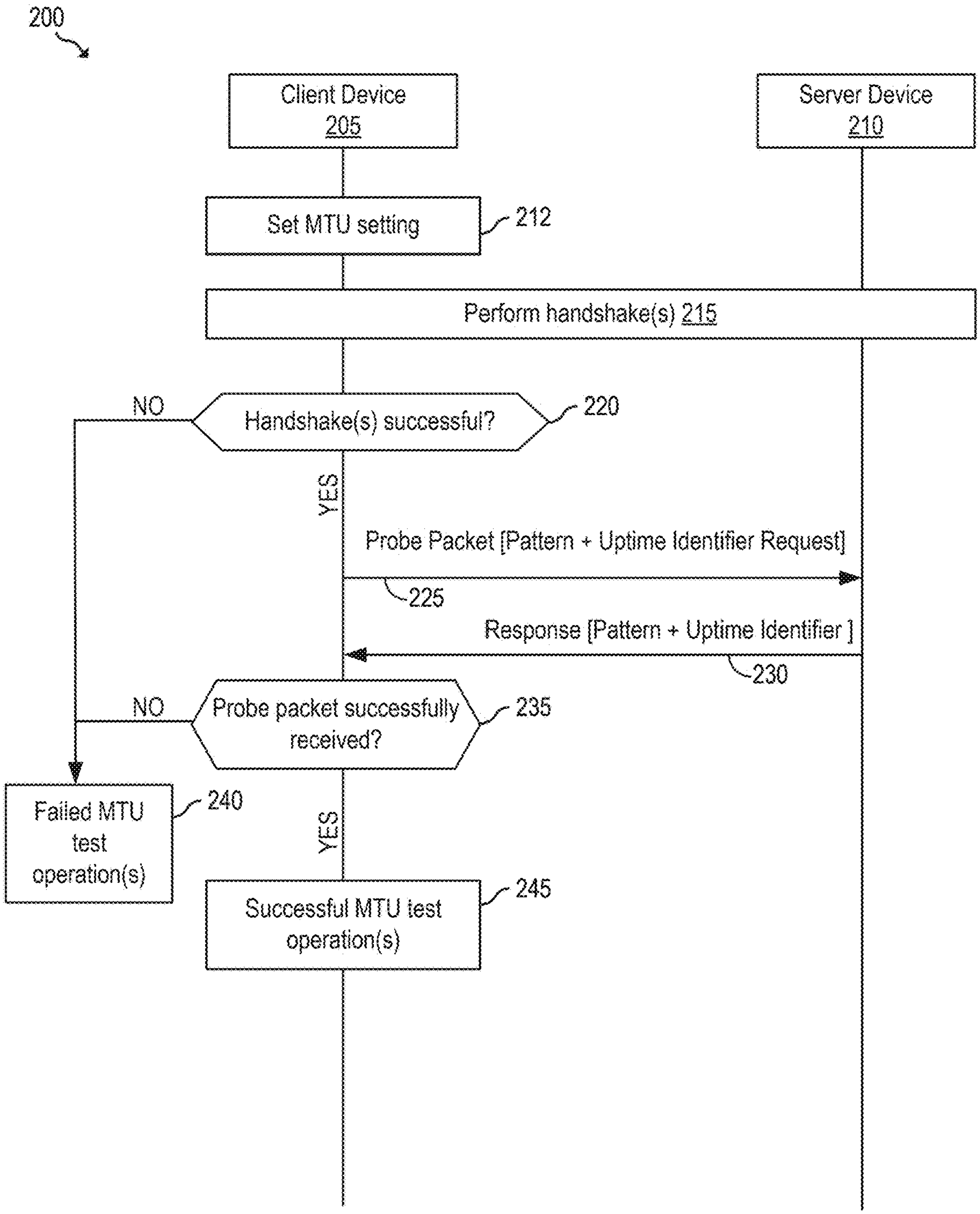
FIG. 2 is a flow diagram of a process for performing an MTU test and determining whether the MTU test was successful, according to some examples.

To perform the MTU test with the minimum MTU setting, the client device may attempt communicating with the server device via the connection using the minimum MTU setting, as described in greater detail with respect to FIG. 2. For instance, the client device may, using the socket, transmit a probe packet having a size matching the minimum size and including a request for an uptime identifier. To determine (at 110) whether the MTU test with the minimum MTU setting was successful, the client device may determine whether this attempted communication with the server device was successful. As described with respect to FIG. 2, the client device may determine whether the communication was successful based on one or more handshakes, messages (e.g., packets and/or responses) exchanged between the client device and the server device, or the like.

A successful MTU test with the minimum MTU setting may indicate that the server device is contactable via the network, as successful communication with the client device may indicate that the server device is experiencing uptime (e.g., is powered on, is operational, or the like) and is available to be reached over a network. Thus, in some examples, the client device may perform the MTU test with the minimum MTU setting to verify whether the server device is contactable. In response to determining the server device is contactable (e.g., in response to a successful MTU test with the minimum MTU setting), the client device may (at 120) store an uptime identifier received from the server, and as described in greater detail herein, the client device may use this uptime identifier to verify that the server device maintained a continuous uptime, uninterrupted by downtime.

A successful MTU test with the minimum MTU setting may further indicate that the connection may support the minimum MTU setting (e.g., that the minimum MTU setting is suitable for communication between the client device and the server device). Because the minimum MTU setting may be defined by the network protocol used to facilitate communication between the client device and the server device, the connection between the client device and the server device should (in accordance with the protocol) support at least the minimum MTU setting. In this regard, rather than indicate that the minimum MTU setting is not supported by the connection, an unsuccessful (e.g., failed) MTU test with the minimum MTU setting may indicate that an issue independent of the MTU setting, such as an issue with the network and/or server device, disrupted communication between the client device and the server device.

An unsuccessful MTU test with the minimum MTU setting may, for example, indicate that the server device is not contactable. The server device may not be contactable as a result of an issue at the server device, an issue with the network connecting the client device and the server device, or the like. For instance, the server device may not be contactable during downtime of the server device (e.g., during a period when the server device is not functioning), the server device may not be contactable if, due to an issue, the network is unable to connect the client device to the server device, or the like.

Responsive to determining that the MTU test failed, the client device may (at 115) wait for a predetermined (e.g., preconfigured) delay period. As an illustrative example, the delay period may be 1 millisecond (ms), 10 ms, 100 ms, 1 second(s), 10 s, 100 s, or the like. In some examples, in waiting (at 115), the client device may sleep, enter a low power mode, perform operations separate from the process 100, perform operations related to a different connection (e.g., associated with a different server device), or the like. As described, the MTU test may fail due to an issue with the server device and/or an issue with the network used to transmit the probe packet. Accordingly, by waiting for the predetermined delay period to elapse, the client device may (at 105) repeat the MTU test with the minimum MTU setting after a time in which the issue with the server device and/or network is addressed. In this regard, because an MTU test with any MTU setting may fail while the server is not contactable, the client device may confirm whether the server device is contactable and may wait until the server device is contactable to test other MTU setting(s) (e.g., to discover an MTU setting).

Responsive to determining (at 110) that the MTU test with the minimum MTU setting was successful, the client device may (at 120) store an uptime identifier received from the server. In some examples, in performing the MTU test with the minimum MTU setting, the client device may receive the uptime identifier from the server device. For instance, as described in greater detail herein, the server device may transmit the uptime identifier to the client device in response to a request for the uptime identifier, which may be included in the probe packet transmitted by the client device. The client device may store the uptime identifier in a cache, a memory, a storage, or the like associated with the socket and/or connection to the server device.

The uptime identifier may be a number, string, and/or the like that identifies an uptime period of the server device, remains static during an uptime of the server device, and is changed based on interruption of that uptime (e.g., due to the server device being powered off, restarted, not operational, or the like). For instance, the uptime identifier may be a random number (e.g., a token) generated by the server to identify a particular uptime. Additionally or alternatively, the uptime identifier may be a timestamp. The timestamp may, for example, identify the time the uptime began (e.g., a time the server was powered on, restarted, or the like).

Responsive to determining (at 110) that the MTU test with the minimum MTU setting was successful, the client device may further discover an MTU setting for a socket associated with the connection between the client device and the server device by testing one or more MTU settings of various sizes. In this regard, responsive to receiving the uptime identifier (e.g., a first uptime identifier), the client device may transmit, via the socket, a probe packet having a size and including a request for an uptime identifier. In particular, the client device may (at 125) perform an MTU test with an MTU setting of N, where N represents a particular size. The client device may (at 130) determine whether the MTU test with the MTU setting of N was successful, and if not, the client device 130 may (at 135) change the value of N and (at 125) perform an MTU test with an MTU setting of the updated N value.

The task 125 may be similar to and may be performed as described with respect to task 105. In this regard, to perform the MTU test with the MTU setting of N, the client device may attempt communicating with the server device via the connection using the MTU setting of N. In particular, the client device may transmit, via the socket, a probe packet having the size N and including a request for an uptime identifier from the server device. In some examples, the client device may (at 125) perform the MTU test with an initial value of N for the MTU setting. The initial value of N may be a maximum size for the MTU setting. The maximum size for the MTU setting may be a size configured at the client device, such as a system configured MTU setting, for example. In some examples, the maximum size for the MTU setting may be dictated by a capability of the client device, and devices with different capabilities may be configured with different maximum sizes for the MTU setting.

The client device may (at 130) determine whether the MTU test with the MTU setting of N was successful. In some examples, the task 130 may be similar to and may be performed as described with respect to task 110. In this regard, the client device may determine whether the MTU test with the MTU setting of N was successful based on one or more handshakes, messages (e.g., packets and/or responses) exchanged between the client device and the server device, or the like.

A successful MTU test with the MTU setting of N may indicate that, from end-to-end, the connection between the client device and the server device supports the MTU setting of N. In this regard, with the MTU setting of N, the client device may successfully transmit a packet to the server device via the socket (using the transport layer), and the client device may further successfully receive a packet, such as a response, from the server device at the socket (using the transport layer). Thus, in the case of a successful MTU test, the client device may receive, via the socket, a response to the probe packet (transmitted at 125 in connection with the MTU test) from the server device. The response may indicate that the probe packet was successfully received at the server device, as illustrated and described in greater detail with respect to FIG. 2. The response may further include an uptime identifier (e.g., a second uptime identifier) from the server device.

For values of N greater than the minimum MTU setting, a failed MTU test may indicate that the MTU setting of N is not supported by the connection and/or that the server device is not contactable. For values of N not greater than the minimum MTU setting, a failed MTU test may indicate that the MTU setting of N is not contactable, as described in greater detail herein.

Responsive to determining (at 130) that the MTU test with the MTU setting of N failed, the client device may (at 135) change the MTU setting to be tested by changing the value of N. In some examples, the client device may change the value of N by decrementing N by some amount. For instance, responsive to determining that the MTU test with an MTU setting of a maximum size failed, the client device may decrement the value of N to perform an MTU test with an MTU setting of a smaller size.

In some examples, the client device may (at 135) change the value of N by incrementing the value of N by some amount. For instance, the initial value of N may be the minimum size for the MTU setting, and responsive to determining that an MTU test with an MTU setting at the minimum size succeeds, the client device may increment the value of N by some amount and perform an MTU test with MTU setting set to the updated value of N to discover an MTU setting for the connection. Further, in some examples, the initial value of N may be between the maximum and the minimum size of the MTU setting. Accordingly, the client device may change the value of N by incrementing or decrementing its value. For instance, in some examples, the client device may test MTU settings with the initial value and values greater than the initial value (by incrementing the value of N (at 135)) prior to testing MTU settings less than the initial value (by decrementing the value of N (at 135)). Alternatively, the client device may test MTU settings with the initial value and values less than the initial value (by decrementing the value of N (at 135)) prior to testing MTU settings greater than the initial value (by incrementing the value of N (at 135)).

In some examples, using a maximum size for the MTU setting as the initial value of N and decrementing the value of N to discover the MTU setting may be more efficient than alternative approaches. In this regard, the client device may test fewer MTU settings (e.g., by (at 125) performing MTU test(s)) than in examples using alternative approaches. In approaches where MTU setting sizes are incremented as they are tested, for example, locating a highest value for the MTU setting that will result in the MTU test being successful may involve testing until the point of failure, which may involve multiple successful MTU tests, and backtracking to a previous MTU setting size. In contrast, by decrementing from the maximum MTU setting, the highest MTU setting size may be identified upon a successful MTU test.

In some examples, the client device may (at 135) change the value of N by a fixed size each time the client device performs the task 135 of the process 100. As an illustrative example, the client device may (at 125) test a first value of N and may, responsive to determining the MTU test failed (at 130), change the value of N by the fixed size to a different, second value of N. The client device may (at 125) test this second value of N and may, responsive to determining the MTU test failed (at 130), again change the value of N by the fixed size to a third value of N. The fixed size may be an integer value. Examples of the fixed size may include 1 byte, 5 bytes, 10 bytes, 50 bytes, 100 bytes, or the like. In some examples, the client device may change the value of N by a variable amount. For instance, the client device may reduce a first value of N by a first size to produce a second value of N, and responsive to determining an MTU test with the MTU setting was successful, the client device may increase the second value of N by a different, second size to produce a third value of N. Further, in some examples, the client device may change the value of N based on a response received from the server device. For instance, in response to determining a length of the response is short of an expected length by a particular number of bytes, the client device may reduce the value of N by that number.

As illustrated, in some examples, the client device may (at 140) verify that the updated value of N is not less than the minimum MTU setting size by, for example, comparing the value of N to the minimum MTU setting size. While a connection may facilitate communication between the client device and the server device using an MTU setting size that is lower than the minimum MTU setting size, communicating with such an MTU setting size may be inefficient, especially in comparison with communication using a greater MTU setting size (e.g., involving larger packet sizes). In this regard, because the minimum MTU setting may be defined by a network protocol used to facilitate communication between the client device and the server device, the connection between the client device and the server device should (in accordance with the protocol) support at least the minimum MTU setting. Accordingly, by verifying that the updated value of N is not less than the minimum MTU setting size, the client device may ensure that the size of packets used to communicate with the server device is not limited beyond the size set by the minimum MTU setting supported by the connection.

Moreover, in some examples, the value of N falling below the minimum MTU setting may indicate that the server device was not contactable while the client device performed the operation(s) of tasks 125-140. In this regard, rather than failing because the MTU setting was not supported, one or more MTU tests may have failed (at 130) because communication between the client device and the server device was interrupted due to an issue with the server device, such as the server device experiencing downtime, and/or an issue with the network. Accordingly, the verification (at 140) may further serve as a verification of whether the server device is contactable.

Responsive to determining value of N is less than the minimum MTU setting size, the client device may restart the process 100 by (at 105) performing an MTU test with the minimum MTU setting. As described herein, by performing the MTU test with the minimum MTU setting, the client device may verify that the server device is contactable. In some cases, the client device may alternatively repeat task 135 by changing the value of N to an alternative value. For instance, in response to decrementing the value of N by a step size that caused N to be less than the minimum MTU setting size, the client device may increment the value of N or may revert to a previous value of N and may decrement this value by a smaller step size. Responsive to determining value of N is not less than the minimum MTU setting size, on the other hand, the client device may (at 125) perform an MTU test with the updated value of N as the MTU setting.

Responsive to determining (at 130) that the MTU test with the MTU setting of N succeeded, the client device may (at 145) determine whether uptime identifiers received from the server device match. As described, an uptime identifier may be a token (e.g., a random number), a timestamp, or the like. Accordingly, comparing the first uptime identifier and the second uptime identifier may involve comparing tokens, comparing timestamps, or the like. In determining whether the uptime identifiers match, the client device may verify that the size N and the resulting size of the MTU setting was not changed (e.g., lowered) (at 135) due to downtime of the server device. In this regard, the client device may verify that the server device experienced uninterrupted uptime while the client device tested various MTU setting(s) (e.g., performed and/or repeated tasks 125-140) to ensure that any failed MTU tests (identified at 130) did not result from downtime of the server device (an issue independent of the MTU setting).

In some examples, the client device may compare a first uptime identifier received in association with an MTU test of the minimum MTU setting (e.g., received at 105) with a second uptime identifier received in association with an MTU test of the MTU setting size of N (e.g., received at 125). For instance, the uptime identifier stored at 120 may be the first uptime identifier, and the second uptime identifier may be an uptime identifier received at 125. A difference between the first uptime identifier and the second uptime identifier may indicate that the server experienced downtime at some point after the server transmitted the first uptime identifier, as the server device may maintain a static uptime identifier during an uptime of the server device and may change (e.g., refresh) the uptime identifier upon downtime. The first uptime identifier and the second uptime identifier matching, on the other hand, may indicate that the server experienced uninterrupted uptime between transmission of the first uptime identifier and the second uptime identifier (e.g., between the MTU test with the minimum MTU setting and the MTU test with the MTU setting of size N).

The client device may (at 145) additionally or alternatively compare an uptime identifier received in response to a probe packet having the MTU setting size of a first value of N with an uptime identifier received in response to a probe packet having the MTU setting size of a second value of N. For instance, in some examples, the client device may (at 125) perform an MTU test with an MTU setting having a first value of N, receive a first uptime identifier from the server device, change the value of N to a second value of N (at 135), perform an MTU test with an MTU setting having a second value of N (at 125), receive a second uptime identifier from the server device, and (at 145) compare the first uptime identifier and the second uptime identifier.

Responsive to determining (at 145) that the uptime identifiers do not match, the client device may restart the process 100 by (at 105) performing an MTU test with the minimum MTU setting. In this regard, the client device may verify that the server device is contactable and may continue to discover an MTU setting.

Responsive to determining (at 145) that the uptime identifiers match, the client device may (at 150) store the size N as the MTU setting for the socket associated with the connection. In this regard, the client device may store the size N (e.g., the size of the probe packet transmitted at 125 in connection with the MTU test) as the MTU setting for the socket responsive to determining that the first uptime identifier and the second uptime identifier identify an uninterrupted uptime of the server device. The client device may store the uptime identifier in a cache, a memory, a storage, or the like associated with the socket. In some examples, the client device may use the stored MTU setting for the socket to communicate between the client device and the server device without having to repeat the process 100.

In some examples, the stored MTU setting may be reset (e.g., to a default value, such as a preconfigured value for the client device, a null value, or the like). For instance, in cases where the client device stores the size N as the MTU setting in a cache memory, the cache memory, including the MTU setting stored therein, may be reset upon shutdown or restart of the client device. Further, in cases where the connection between the client device and server device ends abruptly or unexpectedly the stored MTU setting may be reset, as the MTU setting supported by the connection between the client device and server device may have changed. As an illustrative example, in some cases where an intermediary device in the network path between the client device and the server device fails, an alternate path may be used to transmit packets between the client device and the server device, and the MTU setting supported by the alternate path may vary from the previously stored MTU setting.

The client device may (at 155) transmit data via the socket using the stored MTU setting (e.g., the MTU setting of the socket). For example, the client device may transmit, via the socket, a data packet to the server device using the MTU setting of the socket, which may involve transmitting a data packet having a size set based on the MTU setting of the socket. In some examples, the data packet may include data to be communicated to the server device rather than a pattern used for MTU testing purposes. While a data packet and a probe packet are described separately, in some examples, a data packet may be used as a probe packet.

As described herein, a client device may be a computing device (e.g., a computing node) running an application in communication with a server device, which may be another computing device. For instance, in running the application, the client device may request information and/or a service from a server device, and the server device may, in response to the request, transmit the requested information and/or perform the requested service. In some examples, the client device may establish a connection with the server device over a network to facilitate this communication. While examples are described with reference to a client device and a server device, it may be appreciated that operations described herein may be performed by any suitable computing devices (e.g., computing nodes).

As further described herein, a network connecting the client device and the server device (e.g., via a network path) can use wired communications, wireless communications, or combinations thereof. Further, the network can include multiple sub-networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, the network can be in the form of a direct network link between devices. Various communications structures and infrastructure can be utilized to implement the network(s).

Figure 3:
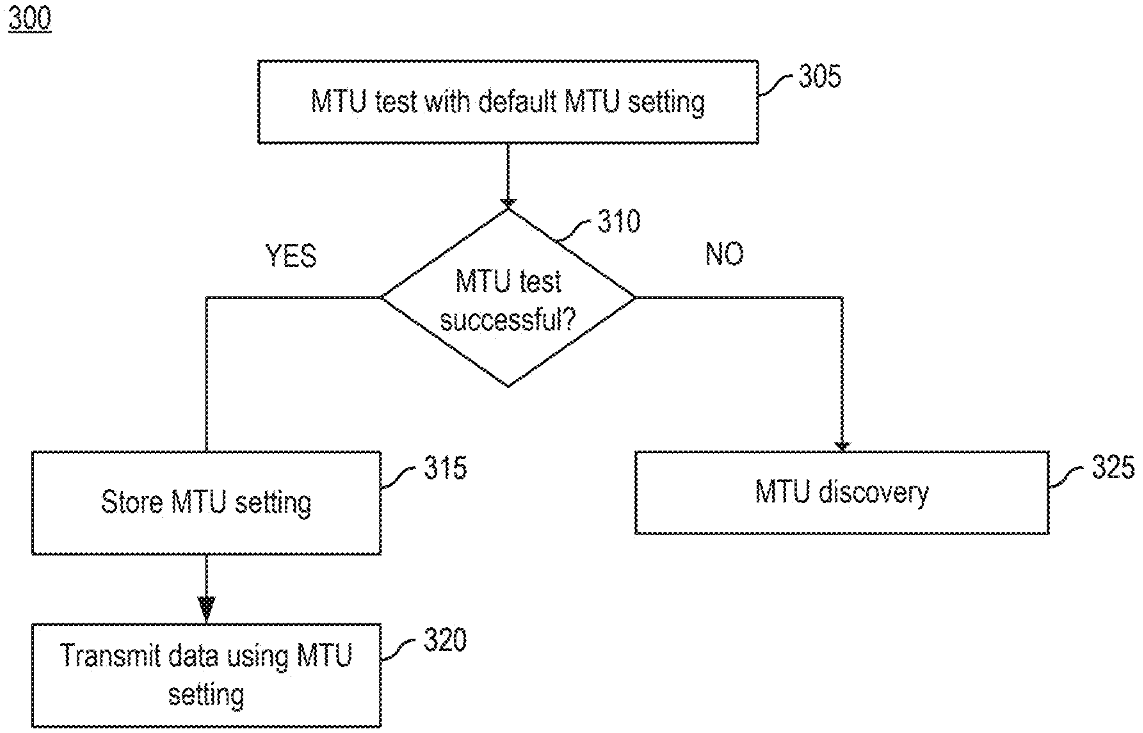
FIG. 3 is a flow diagram of a process for testing a default MTU setting, according to some examples.

FIG. 2 is a flow diagram of a process 200 for performing an MTU test with a given MTU setting for a connection and determining whether the MTU test with the given MTU setting was successful, according to some examples. Process 200 may be an example of tasks 105-110 (FIG. 1), tasks 125-130 (FIG. 1), and/or tasks 305-310 (FIG. 3). Process 200 may be implemented in the form of executable instructions stored on a machine-readable storage medium (e.g., machine-readable storage medium 620 of FIG. 6, machine-readable storage medium 700 of FIG. 7, or the like) and/or in the form of electronic circuitry. As illustrated, the process 200 may be performed by the client device 205 and the server device 210, each of which may be a computing device, by executing the instructions stored in a machine-readable medium. Examples of the client device may include client device 405 of FIG. 4, computing device 600 of FIG. 6, or the like, and examples of the server device may include server device 410 of FIG. 4, computing device 600 of FIG. 6, or the like. Additionally, in some examples, the components for executing the process 200 may be spread among multiple devices. Although FIG. 2 shows tasks performed in a given order, the tasks may be performed in a different order, some tasks may be omitted, and other tasks may be added.

To perform an MTU test with a given MTU setting (an MTU setting with a given size), the client device 205 may attempt to communicate with the server device 210 via the connection and using the transport layer. In some examples, the client device 205 may use the transport layer by using a socket (e.g., a TCP socket, a UDP socket, or the like) to communicate to a destination network address and port number, which may involve use of a transport layer protocol (e.g., TCP, UDP, or the like). For instance, in communicating via a TCP socket, the client device may use TCP, and in communicating via a UDP socket, the client device may use UDP. In some examples, the client device may indirectly use the transport layer to communicate with the server device by, for example, using a protocol layer that uses the transport layer, such as the application layer. In this regard, the client device may use an application layer protocol, such as HTTP, to attempt to communicate with the server device. Moreover, in some examples, in using a higher layer (e.g., the application layer) to communicate with the server device, the client device may use a socket or a socket-like interface—having a destination network address and a port number—which may also be referred to as a socket. Thus, techniques described herein apply to techniques involving the transport layer and/or higher layers (e.g., the application layer).

To communicate with the server device, the client device 205 may (at 212) set the MTU setting for the socket to the given size. Setting the MTU setting for the socket may involve setting a maximum segment size (MSS) for the socket. In this regard, the MTU setting may relate to the MSS such that by setting the MSS, the client device 205 may also set the MTU setting. For instance, an MTU setting size may include bytes to accommodate the MSS, as well as a number of bytes for header information, such as an IP header and/or a TCP header. With an IP header and TCP header that together form 40 bytes, for example, the client device 205 may determine the MSS by subtracting 40 bytes from the size of the MTU setting. By setting the MSS to a value determined based on the desired MTU setting size (e.g., by subtracting an amount from the desired MTU setting size), the client device may set the MTU setting. In some examples, the client device 205 may set the MSS at the socket using an application programming interface (API), such as a socket API.

To perform the MTU test with the minimum MTU setting (e.g., at 105 of FIG. 1), the client device 205 may set the MTU setting to the minimum MTU setting size (e.g., by setting the MSS accordingly). As described with respect to FIG. 1, in some examples, the client device 205 may use the minimum MTU setting to verify whether the server device 210 is contactable. To perform the MTU test with the MTU setting of N (e.g., at 125 of FIG. 1), where N represents a particular size, the client device 205 may set the MTU setting to the size of N (e.g., by setting the MSS accordingly). As further described, the client device 205 may may perform MTU test(s) with various values of N to discover an MTU setting.

In some examples, to communicate with the server device, the client device 205 may establish a protocol connection with the server device 210. To establish the protocol connection, the client device 205 and the server device 210 may (at 215) perform handshake(s) using the given MTU setting (set at 212). In some examples, the client device 205 and the server device 210 may perform the handshake(s) to establish a socket and/or other protocol connection over the network. For instance, to form a TCP connection (for a TCP socket), the client device 205 and the server device 210 may perform a TCP handshake (e.g., a three-way TCP handshake). In particular, the client device 205 may transmit a synchronization request (SYN) to the server device 210, the server device 210 may respond with a synchronization acknowledgement (SYN-ACK), and, in response, the client device 205 may transmit an acknowledgement (ACK) to the server device 210. In other examples, the client device 205 may establish the socket without performing handshake(s). For instance, a UDP socket may be a socket that relies on UDP, a connection-less protocol that may function without establishing a protocol (e.g., a UDP) connection.

In some examples, the client device 205 and the server device 210 may perform an additional handshake to establish transport layer security (TLS) (e.g., a TLS session) over a protocol connection, which may provide security and reliability to the connection. TLS over TCP may, for example, offer encryption and authentication of data exchanged between the client device 205 and the server device 210. The client device 205 and the server device 210 may perform the additional handshake to negotiate cryptographic algorithms, as well as keys used for encryption and authentication, to be used in the TLS session. The client device 205 may further perform the additional handshake to verify that the client device 205 is interacting with a valid server. Like the TCP handshake, the client device 205 and the server device 210 may exchange a number of messages in performing the additional handshake. In some cases, messages exchanged in the additional handshake may exceed the size of messages exchanged in the TCP handshake, as the additional handshake may involve transmitting one or more certificates for the above tasks.

The client device 205 may (at 220) determine whether the handshake(s) were successful. The client device 205 may determine whether the handshake(s) were successful based on the messages the client device 205 received or failed to receive from the server device 210. In this regard, the handshake(s) may dictate a sequence of messages to be exchanged between the client device 205 and the server device 210. Based on successfully receiving the messages dictated by the handshake(s), the client device 205 may determine that the handshake(s) were performed successfully. Based on failing to receive the messages (e.g., failing to receive the messages within a timeout period) dictated by the handshake(s), the client device 205 may determine that the handshake(s) were not performed successfully.

In determining whether the handshake(s) were successful, the client device 205 may determine whether the MTU test with the given MTU setting (set at 212) failed. In this regard, an MTU test may fail at any stage, including during handshake(s) (e.g., at 215), in transmission of a probe packet, or the like.

In some examples, the messages transmitted in the TCP handshake may be relatively small. In this regard, because the size of the messages for the TCP handshake may be below the size of an MTU setting (even a minimum MTU setting), the TCP handshake may be unlikely to fail based on an MTU setting size being unsupported (e.g., based on MTU mismatch). In some cases, messages exchanged in the additional handshake for establishing TLS may exceed the size of messages exchanged in the TCP handshake, as the additional handshake may involve transmitting one or more certificates for the above tasks. In some cases, the size of a message including a certificate or any other message transmitted in this additional handshake may meet the size of the given MTU setting (set at 245), and MTU mismatch may result in failure of the additional handshake, as the message may be dropped (e.g., by a device that does not support the MTU setting). In this regard, failure of the handshake(s), which may result in a failed MTU test of the given MTU setting, may indicate that MTU setting is not supported by the connection and/or that the server device 210 was not contactable.

In the case of an MTU test with the minimum MTU setting, because the minimum MTU setting may be defined by the network protocol used to facilitate communication between the client device 205 and the server device 210, the connection between the client device 205 and the server device 210 should (in accordance with the protocol) support at least the minimum MTU setting. Accordingly, failure of the handshake(s), which may result in a failed MTU test of the minimum MTU setting, may indicate that an issue independent of the MTU setting, such as an issue with the network and/or server device 210, disrupted communication between the client device and the server device. For instance, the server device 210 may not be contactable due to downtime, an issue with the network, an issue with an intermediary device in the network path, or the like.

In the case of an MTU test with the MTU setting of N, where N exceeds the minimum MTU setting, failure of the handshake(s), which may result in a failed MTU test of the given MTU setting, may indicate that the MTU setting is not supported by the connection and/or that the server device 210 was not contactable.

Responsive to determining (at 220) that the handshake was not successful, which may correspond to determining that the MTU test with the given MTU setting failed, the client device may (at 240) perform one or more failed MTU test operation(s), as described in greater detail below. Responsive to determining (at 220) that the handshake was successfully completed, the client device 205 may (at 225) attempt to communicate with the server device 210 using the given MTU setting by transmitting a probe packet to the server device 210. To test the given MTU setting, the size of probe packet may match the given MTU setting size. Further, as illustrated, the probe packet may include a pattern signaling a request (REQ) for a response from the server, as well as a request for an uptime identifier. While the pattern and the uptime identifier request are illustrated separately, in some examples, the pattern may incorporate the uptime identifier request. Moreover, while the probe packet is illustrated and described as having a particular pattern, in some examples, the probe packet may be a data packet having information to be communicated to the server device 210.

As described herein, the client device 205 may transmit the probe packet via the transport layer. The client device 205 may, for example, transmit the probe packet via a socket (e.g., a TCP socket, a UDP socket, or the like) associated with (e.g., in connection with) the server device 210. The client device 205 may transmit the probe packet to a corresponding socket at the server device 210. In some examples, the client device may indirectly use the transport layer to communicate with the server device by, for example, using a protocol layer that uses the transport layer, such as the application layer. By transmitting the probe packet via the transport layer (directly or indirectly), the client device 205 may test—at the protocol level used by an application run on the client device 205 rather than a lower protocol level (e.g., internet layer)—whether, using the given MTU setting, the client device 205 may communicate over the connection with the server device 210.

In some examples, the client device 205 may permit packet fragmentation (e.g., by the client device 205 and/or an intermediary device) in the transmission of the probe packet, while in other examples, the client device 205 may prohibit packet fragmentation in the transmission of the probe packet. The client device 205 may indicate whether packet fragmentation is permitted using a "Don't Fragment" (DF) flag in the IP header of the probe packet, for example. To permit packet fragmentation, the client device 205 may transmit the probe packet with a DF flag set to a first value (e.g., with the DF flag set to 0), and to prohibit packet fragmentation, the client device 205 may transmit the probe packet with a DF flag set to a second value (e.g., with the DF flag set to 1). In some examples, the first value may be a default value for the DF flag. Accordingly, the client device 205 may maintain the default value for the DF flag to transmit the probe packet with packet fragmentation, and the client device 205 may change the value of the DF flag by setting the DF flag to the second value to transmit the probe packet without packet fragmentation.

In response to receiving the probe packet, the server device 210 may (at 230) transmit a response to the client device 205. The server device 210 may transmit the response via the transport layer, such as via a socket. As shown, the response may include a pattern signaling an acknowledgement (ACK) to the client device 205, as well as a first uptime identifier. The first uptime identifier may identify an uptime of the server device, may remain static while the server device 210 experiences this uptime, and may be changed when the server device 210 experiences downtime (e.g., is powered off, restarts, or the like). While the pattern and the uptime identifier are illustrated separately in the response, in some examples, the response may incorporate the uptime identifier request in the pattern. Further, in some examples, the client device 205 may receive the response via the transport layer, such as via a socket at the client device 205.

As described, in some examples, the client device 205 may permit packet fragmentation in the transmission of the probe packet. In cases where the probe packet is fragmented, receiving the probe packet at the server device 210 may involve receiving fragments of the probe packet and reassembling the fragments into the probe packet. In some examples, the server device 210 may permit packet fragmentation (e.g., by the server device 210 and/or an intermediary device) in the transmission of the response. For instance, the server device 210 may permit packet fragmentation in response to the client device 205 permitting packet fragmentation, such as in response to receiving a probe packet indicating that packet fragmentation is permitted. As described with the client device 205, the server device 210 may indicate whether packet fragmentation is permitted using a "Don't Fragment" (DF) flag in the IP header of the response, for example. In other examples, the server device 210 may prohibit packet fragmentation in the transmission of the response. For instance, the server device 210 may prohibit packet fragmentation in response to the client device 205 prohibiting packet fragmentation, such as in response to receiving a probe packet indicating that packet fragmentation is prohibited (e.g., having a DF flag set to the second value).

While the server device 210 is illustrated as transmitting the response to the client device (at 230), in some examples, the server device 210 may fail to receive the probe packet. The server may fail to receive the probe packet if the server device 210 is not contactable, for example. In cases where the server device 210 fails to receive the probe packet, the server device 210 may also fail to transmit the response. Further, in some cases, the server device 210 may receive the probe packet but may fail to transmit the response to the client device 205. For instance, the server device 210 may fail to transmit the response if the server device 210 experiences downtime before transmitting the response. In some cases, the server device 210 may transmit the response to the client device 205, but the client device 205 may fail to receive the response. For instance, the response may be dropped by an intermediary device, the network may experience an issue interrupting transmission of the response, or the like.

Accordingly, the client device 205 may (at 235) use the response (or lack thereof) to determine whether the probe packet was successfully received at the server device 210. In some examples, the client device 205 may determine that the probe packet was successfully received based on receipt of the response at the client device 205. Additionally or alternatively, the client device may inspect a size and/or a content of the response to determine whether the probe packet was successfully received. For instance, a match between the size of the probe packet and the size of the response may indicate successful receipt of the probe packet. In some cases, a match between the content of the probe packet (e.g., the pattern included in the probe packet) and the content of the response (e.g., the pattern included in the response) may indicate successful receipt of the probe packet. In other examples, the server device 210 may generate the response by overriding (e.g., changing the value of) the pattern received in the probe packet. In such cases, the client device 205 may determine whether the probe packet was successfully received at the server device 210 based on the entire pattern included in the probe packet being overridden in the response.

Further, as described, in some examples, the server device 210 may permit packet fragmentation in the transmission of the response. In cases where the response is fragmented, receiving the response at the client device 205 may involve receiving fragments of the response and reassembling the fragments into the response. In such cases, the client device 205 may further determine that the probe packet was successfully received based on receipt of the entire response (e.g., each of the fragments of the response) at the client device 205.

To determine that the probe packet was not successfully received, on the other hand, the client device 205 may determine that the client device 205 failed to receive a response within a timeout period. In cases where the client device 205 received the response (e.g., within the timeout period), the client device 205 may determine that the probe packet was not successfully received based on the response failing to have an expected size and/or include an expected content. For instance, the client device 205 may determine that the probe packet was not successfully received based on a mismatch between the size of the probe packet and the size of the response and/or a mismatch between the content of the probe packet and the content of the response. In some examples, determine that the probe packet was not successfully received at the server device 210 based on less than the entire pattern included in the probe packet being overridden in the response.

In determining whether the probe packet was successfully received, the client device 205 may further determine whether the MTU test with the given MTU setting was performed successfully. In cases where the client device 205 determines (at 235) that the probe packet was successfully received, the client device 205 may determine that the MTU test with the given MTU setting was performed successfully. In cases where the client device 205 determines (at 235) that the probe packet was not successfully received, on the other hand, the client device 205 may determine that the MTU test with the given MTU setting was not performed successfully.

In some cases, a network path used to transmit the probe packet from the client device 205 to the server device 210 may vary from the network path used to transmit the second response from the server device 210 to the client device 205. In particular, the network path may support different MTU settings for packets sent in a first direction (from client device 205 to server device 210) from packets sent in a second direction (from server device 210 to client device 205). Accordingly, by determining whether the probe packet was successfully received at the server device 210 based on the response, the client device 205 may determine that the tested MTU setting is supported by the network path regardless of the direction a packet travels.

By determining whether the probe packet was successfully received at the server device 210 based on the response, the client device 205 may further identify an MTU setting suitable for (e.g., supported by) an end-to-end connection between the client device 205 and the server device 210 regardless of packet fragmentation and/or the components, such as dynamic NAT device, a VPN, or the like, included in the network path. In this regard, the client device may determine the MTU setting based on successfully transmitting a probe packet and receiving a corresponding response while remaining agnostic to packet fragmentation and/or the components in the network path used to do so. With the given MTU setting, for example, the client device 205 may successfully transmit a packet to the server device 210 via the socket, and the client device 205 may successfully receive a packet, such as a response, from the server device 210 at the socket, confirming at the protocol level used by an application (e.g., at the transport layer) run on the client device 205 that the client device 205 may communicate over the connection with the server device 210. Packets sized based on the MTU setting and transmitted between the client device 205 and the server device 210 may also be successfully forwarded (using packet fragmentation or not) by intermediary device(s) and/or through component(s) included in the network path between the client device and the server device.

Failure of the probe packet being received, which may result in a failed MTU test of the given MTU setting, may indicate that MTU setting is not supported by the connection and/or that the server device 210 was not contactable. In the case of an MTU test with the minimum MTU setting, because the minimum MTU setting may be defined by the network protocol used to facilitate communication between the client device 205 and the server device 210, the connection between the client device 205 and the server device 210 should (in accordance with the protocol) support at least the minimum MTU setting. Accordingly, determining that the probe packet was not successfully received, which may result in a failed MTU test of the minimum MTU setting, may indicate that an issue independent of the MTU setting, such as an issue with the network and/or server device 210, disrupted communication between the client device and the server device. For instance, the server device 210 may not be contactable due to downtime, an issue with the network, an issue with an intermediary device in the network path, or the like.

Responsive to determining (at 235) that the probe packet was not successfully received, which may correspond to determining that the MTU test with the given MTU setting failed, the client device 205 may (at 240) perform one or more failed MTU test operation(s). In some examples, performing one or more failed MTU test operation(s) (at 240) may involve retrying an MTU setting (e.g., repeating an MTU test with the MTU setting). For instance, in the case of a minimum MTU setting, the client device 205 may, as described with respect to task 115 (FIG. 1), wait for a predetermined (e.g., preconfigured) delay period before reattempting an MTU test with the minimum MTU setting to provide time for an issue at the server device 210 and/or with the network to be addressed. In this regard, the client device 205 may wait for the predetermined delay before reattempting to perform the handshake(s) (at 215) with the minimum MTU setting and/or before reattempting to transmit the probe packet (at 225).

In some examples, performing one or more failed MTU test operation(s) (at 240) may involve testing a different MTU setting as described with respect to task 135 (FIG. 1) and/or task 325 (FIG. 3). In some cases, for example, the client device 205 may change the size of the MTU setting to be tested. The client device 205 may then test the changed size of the MTU setting by, for example, restarting the process 200 with the changed size. In some examples, to change the MTU setting, the client device 205 may disconnect (e.g., terminate) the protocol connection, change the MTU setting, and re-establish the protocol connection with the changed MTU setting (or establish a new connection). For instance, the client device 205 may disconnect a socket to change the MTU setting at the socket. Re-establishing a protocol connection and/or setting the MTU setting for the connection may involve operations described herein with respect to task 212 and/or 215. While changing the MTU setting may involve disconnecting a protocol connection and re-establishing the protocol connection (or establishing a new protocol connection), as described herein, the series of protocol connection(s) used to connect client device 205 to the server device 210 using the techniques described herein may be referred to collectively as a common "protocol connection." For instance, a socket with a first MTU setting and connecting the client device 205 to a particular destination address and port, as well as a socket with a second MTU setting and connecting the client device 205 to the particular destination address and port, may each be referred to as a common socket for the client device 205.

Responsive to determining (at 235) that the first probe packet was successfully received, which may correspond to determining that the MTU test with the given MTU setting was successful, the client device 205 may (at 245) perform one or more successful MTU test operation(s). In some examples, performing one or more successful MTU test operation(s) may involve storing an uptime identifier received from the server device 210 and testing other MTU setting(s), as described with respect to tasks 120-125 (FIG. 1). In some examples, performing one or more successful MTU test operation(s) may involve comparing uptime identifiers received from the server device, as described with respect to task 145 (FIG. 1). In some examples, performing one or more successful MTU test operation(s) may involve storing the given MTU setting and transmitting data using the stored MTU setting, as described with respect to tasks 315-320 (FIG. 3).

In some examples, the client device may discover an MTU setting for a connection when the connection is initialized. For instance, before sending a data packet to the server device, a client device may perform operations of process 100 (FIG. 1) and/or process 200 (FIG. 2) to discover the MTU setting. With the MTU setting, the client device may transmit the data packet. In other examples, the client device may selectively discover the MTU setting. For instance, the client device may perform operations of process 100 (FIG. 1) and/or process 200 (FIG. 2) periodically, according to a schedule, or the like. As described with respect to FIG. 3, the client device may additionally or alternatively perform such operations in response to an event, such as in response to failing an MTU test with a default MTU setting.

FIG. 3 is a flow diagram of a process 300 for testing a default MTU setting for a socket associated with a connection between a client device and a server device, according to some examples. Process 300 may be implemented in the form of executable instructions stored on a machine-readable storage medium (e.g., machine-readable storage medium 620 of FIG. 6, machine-readable storage medium 700 of FIG. 7, or the like) and/or in the form of electronic circuitry. In some examples, operations at each of the method blocks 305-320 may be performed by the client device (e.g., client device 205 of FIG. 2, client device 405 of FIG. 4, computing device 600 of FIG. 6, or the like), which may be a computing device, by executing the instructions stored in a machine-readable medium. Although FIG. 3 shows tasks performed in a given order, the tasks may be performed in a different order, some tasks may be omitted, and other tasks may be added.

The client device may (at 305) perform an MTU test with a default MTU setting. The default MTU setting may be a predetermined (e.g., preconfigured) setting for the client device. For instance, in some examples, the default MTU setting may be the maximum size for the MTU setting, such as the maximum size the client device is capable of using for the MTU setting, as described herein. The default MTU setting may additionally or alternatively be an MTU setting stored at the client device, such as an MTU setting previously discovered according to the techniques described herein, for example.

In some examples, responsive to determining (at 310) that the MTU test was successful, the client device may (at 315) store the default MTU setting as the MTU setting for the socket. The client device may further (at 320) transmit data via the socket using the stored MTU setting.

Responsive to determining (at 310) that the MTU test failed, the client device may perform MTU discovery, which may involve performing operations described herein, such as the operations of process 100 (FIG. 1), operations of process 200 (FIG. 2), or the like. In this regard, upon failing to successfully transmit a probe packet using a default MTU setting, the client device may discover an MTU setting for the socket supported by the connection. As described herein, process 100 and process 200 may begin by verifying that the server device is contactable (e.g., by testing a minimum MTU setting). In this regard, in cases where the server device is contactable, the process 100 and process 200 may verify that the failure of the MTU test (at 310) with the default MTU setting was due to the default MTU being unsupported (e.g., due to MTU mismatch).

Figure 4A:
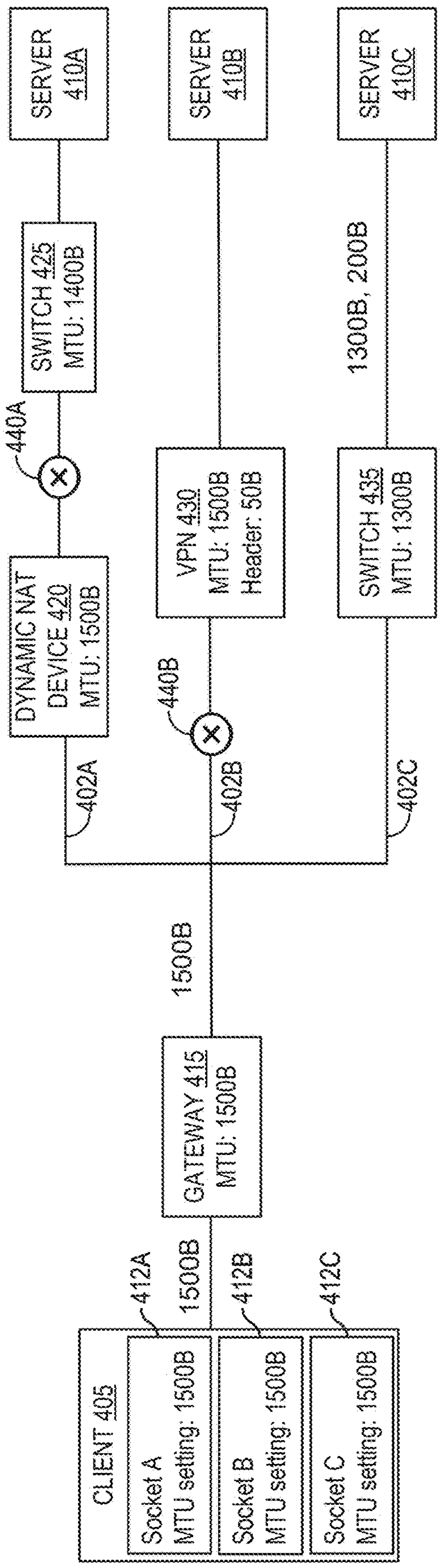
FIG. 4A is a block diagram illustrating an MTU test with a default MTU setting along network paths connecting a client device to various server devices, according to some examples.
Figure 4B:
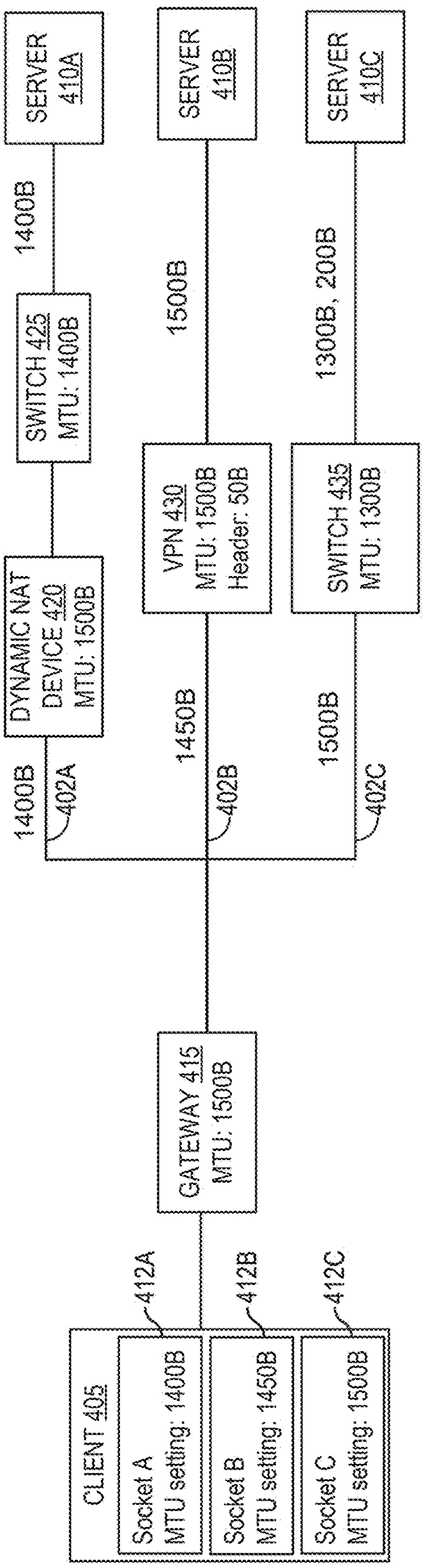
FIG. 4B is a block diagram illustrating an MTU test with a discovered MTU setting along network paths connecting a client device to various server devices, according to some examples.

FIGS. 4A-4B illustrate a block diagram of network paths 402A-C connecting a client device 405 to various server devices 410A-C (referred to herein collectively as server devices 410 or individually as server device 410). FIG. 4A illustrates an MTU test with a default MTU setting for each connection between the client device 405 and a server device 410, while FIG. 4B illustrates the result of an MTU test with a discovered MTU setting (e.g., an MTU setting discovered using the enhanced discovery described herein) for each connection between the client device 405 and a server device 410.

FIGS. 4A-4B further illustrate sockets 412A-C (referred to herein collectively as sockets 412 or individually as socket 412) associated with each connection and having an MTU setting of a particular size. Socket A 412A may be associated with the connection between the client device 405 and server device 410A, socket B 412B may be associated with the connection between the client device 405 and server device 410B, and socket C 412C may be associated with the connection between the client device 405 and server device 410C.

The sockets 412 may each include a socket address, which may be a combination of a network destination address and a port number. Packets may be delivered to the correct application, such as the application running at the client device 405, based on this socket address. Further, as described herein, in establishing a connection with a server device 410, the client device may establish a socket 412 for the connection. In establishing sockets 412, the client device may set (e.g., via the socket API) an MTU setting for the sockets 412. As shown in FIG. 4A, for example, the client device 405 may set the MTU setting for each of socket A 412A, socket B 412B, and socket C 412C to a default MTU setting, such as the illustrated 1500B. As shown in FIG. 4B, the client device 405 may further update the MTU setting for the sockets 412A-C based on discovering an MTU setting using the enhanced discovery techniques described herein. In some examples, the server devices 410A-C may further include sockets. In this regard, communication between the client device 405 and a server device 410 may involve transmitting a packet from a socket at the client device 405 to a socket at the server device 410 or vice versa.

As shown, the network paths 402 between the client device 405 and a given server device 410 may each include a number of components, such as intermediary devices, VPNs, and/or the like. For instance, the network path 402A between the client device 405 and the server device 410A includes a gateway device 415, a dynamic NAT device 420, and a switch device 425. The network path 402B between the client device 405 and the server device 410B includes the gateway device 415 and a VPN 430, and the network path 402C between the client device 405 and the server device 410C includes the gateway device 415 and a switch device 435. While particular combinations of components on network paths are illustrated and described herein, examples are not limited thereto.

As further shown, each component within a network path may have a respective MTU labeled "MTU." These MTUs may impact the MTU setting supported by the connection over the network path between the client device 405 and a server device 410. For instance, with the default MTU setting of 1500 bytes (B) shown in FIG. 4A, a packet, such as a probe packet or a data packet, sized at 1500 bytes and transmitted from the client device 405 to the server device 410A along the network path 402A may be dropped, as indicated by the error signal 440A. More specifically, the packet may be forwarded by the gateway device 415, which has an MTU of 1500 bytes, and the packet may successfully reach and be forwarded by the dynamic NAT device 420, which has an MTU of 1500 bytes. The switch device 425 receiving the packet from the NAT device 420, however, may fail to forward the packet to the server device 410A, as the packet size (1500B) exceeds the MTU (1400B) of the switch device 425. The switch device 425 may, for example, drop the packet.

A packet sized at 1500 bytes may further fail to reach the server device 410B along the network path 402B, as illustrated by the error signal 440B. While this packet may be forwarded by the gateway device 415, the packet may fail to be forwarded at the VPN 430. In this regard, while the VPN 430 may have an MTU of 1500 bytes, the VPN 430 may add a header of 50 bytes to the packet. The header added by the VPN 430 may be, for example, an IP header for transmission through the VPN 430, and with the addition of the header, the size of the packet may be 1550 bytes, which exceeds the MTU of the VPN 430.

In some examples, a packet sized at 1500 bytes may successfully reach the server device 410C along the network path 402C. In this regard, both the gateway device 415 and the switch device 435 may forward the packet along the network path 402C. In some examples, because the size of the packet exceeds the MTU of 1300 bytes of the switch device 435, the switch device 435 may drop the packet, as similarly described with respect to the switch device 425. As illustrated, however, in some examples, the switch device 435 may fragment the packet (e.g., perform packet fragmentation) to forward the packet to the server device 410C. In this regard, the switch device 435 may break the packet into multiple smaller packets, such as a first packet having a size of 1300 bytes and a second packet having a size of 200 bytes, as illustrated. The server device 410C may reassemble the first packet and the second packet to receive the packet.

In some examples, the switch device 435 may perform packet fragmentation rather than dropping the packet based on a capability of the switch device 435. For instance, in some examples, the switch device 435 may be capable of performing packet fragmentation while the switch device 425 may lack that capability and may thus drop a packet (as shown by error signal 440A). Additionally or alternatively, the switch device 435 may perform packet fragmentation based on the packet. For instance, the client device 405 may transmit a packet to the server device 410C with the DF flag set to a first value, which may indicate that packet fragmentation is permitted. In contrast, the client device 405 may transmit a packet to the server device 410A with the DF flag set to a second value, which may indicate that packet fragmentation is not permitted.

Turning to FIG. 4B, using the techniques described herein, the client device 405 may discover an MTU setting for each socket 412A-C associated with a respective connection between the client device 405 and a server device 410. In some examples, the client device 405 may perform MTU discovery to identify the MTU setting for the socket 412A associated with the connection to the server device 410A based on the packet having the size of 1500 bytes (e.g., transmitted using the default MTU setting) failing to reach the server device 410A. Similarly, the client device 405 may perform MTU discovery to identify the MTU setting for the socket 412B associated with the connection to the server device 410B based on the packet having the size of 1500 bytes (e.g., transmitted using the default MTU setting) failing to reach the server device 410B.

As an illustrative example, for the socket 412A, the client device 405 may discover an MTU setting of 1400 bytes. A packet of a corresponding size transmitted by the client device 405 to the server device 410A may successfully be received at the server device 410A, as the packet size is not greater than MTU of any device in the network path 402A. Accordingly, the gateway device 415, the dynamic NAT device 420, and the switch device 425 may each forward the packet so that the packet reaches the server device 410A.

As another illustrative example, for the socket 412B, the client device 405 may discover an MTU setting of 1450 bytes. As illustrated, a packet of 1450 bytes may be forwarded by the gateway device 415 to the VPN 430, and the VPN 430 may add a header of 50 bytes to the packet, resulting in a packet with a size of 1500 bytes being forwarded to the server device 410B.

In discovering these MTU settings, the client device 405 may perform a number of MTU tests using various sizes as the MTU setting (e.g., transmitting packet probes of various sizes). As an illustrative example, for the socket 412A, the client device 405 may test a minimum MTU setting to verify that the server device 410A is contactable, as described herein with reference to task 105 of FIG. 1. Using the MTU test with the minimum MTU, the client device 405 may determine that the packet sized 1500 bytes was dropped due to an issue with MTU mismatch (here with the switch device 425) rather than due to the server device 410A experiencing downtime. The client device 405 may then test MTU setting(s) of various sizes to discover the MTU setting. In some examples, the client device 405 may begin with a maximum size for the MTU setting, which may be the default MTU setting (here 1500 bytes), for example, and may change the test MTU setting size to discover the MTU setting. For instance, the client device 405 may test MTU settings sized 1500 bytes and may decrease the MTU setting size by 5 bytes, 10 bytes, 100 bytes or the like to discover the illustrated MTU setting of 1400B. The client device may identify 1400 bytes as the size for the MTU setting based on a probe packet of 1400 bytes successfully being received at the server device 410A (e.g., based on a response from the server device 410A to the probe packet). Moreover, by using the transport layer (e.g., using the socket 412A) to transmit the probe packet to a network destination address and port number for the server device 410A, the client device may further ensure that the packet reached the server device 410A itself, rather than being stopped at the dynamic NAT device 420.

The client device may further identify 1400 bytes as the size for the MTU setting based on verifying that the server device 410A experienced uninterrupted uptime. The client device 405 may, for example, compare an uptime identifier received in response to the probe packet of 1400 bytes to a previously received uptime identifier, such as an uptime identifier received in response to a probe having the minimum MTU setting size, to verify that the server device 410A maintained uninterrupted uptime during discovery of the MTU setting.

In some examples, the client device 405 may refrain from performing MTU discovery for the socket 412C based on the packet having the size of 1500 bytes (e.g., transmitted using the default MTU setting) successfully reaching the server device 410C. For instance, the client device may instead store the default MTU setting as the MTU setting for the connection to the server device 410C and may transmit data using this stored MTU setting, as described with respect to tasks 315-320 (FIG. 3). In other examples, even with successful transmission of the packet to the server device 410C, the client device 405 may perform MTU discovery to determine whether an MTU setting with a higher size is available for the socket 412C. For instance, in some examples, the default MTU setting may not be a maximum MTU setting for the client device 405. In such cases, the client device 405 may proceed to perform MTU discovery to determine whether a higher size may be used for the MTU setting.

In identifying the MTU setting for the socket 412A as 1400 bytes, the client device 405 may remain agnostic to the components on the network path 402A. Similarly, in identifying the MTU setting for the socket 412B as 1450 bytes, the client device 405 may remain agnostic to the components on the network path 402B, and in identifying the MTU setting for the socket 412C as 1500 bytes, the client device 405 may remain agnostic to the components on the network path 402C. In this regard, regardless of the components included in a network path, the client device 405 may determine the MTU setting for a socket based on successfully transmitting a probe packet and receiving a corresponding response. Accordingly the client device 405 may use the techniques described herein on each of the network paths 402A-C even though these paths include different components.

Figure 5:
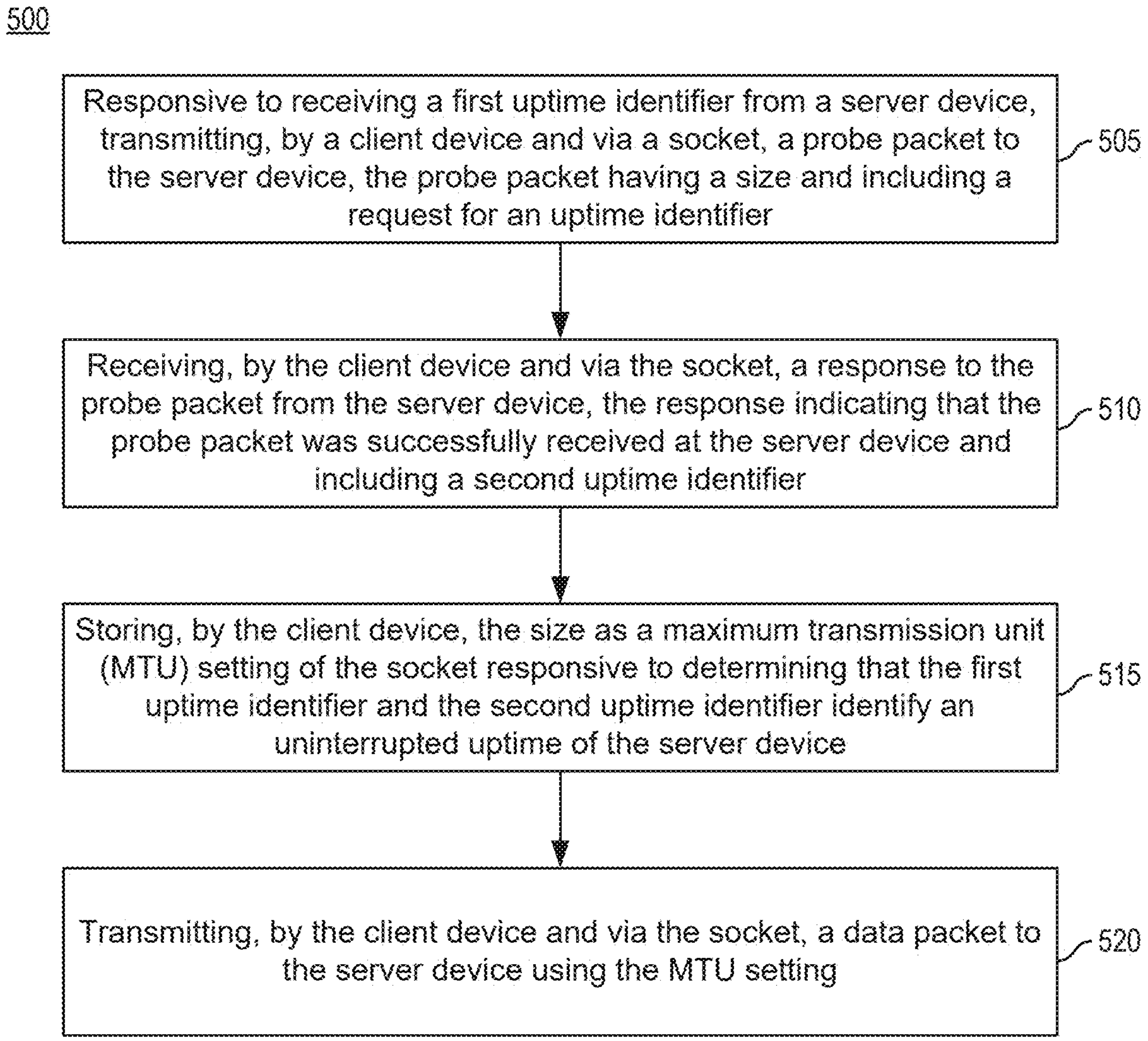
FIG. 5 is a flow diagram of a process for discovering an MTU setting for a socket, according to some examples.

FIG. 5 is a flow diagram of a process 500 for discovering an MTU setting for a socket associated with a connection between a client device and a server device, according to some examples. Although FIG. 5 shows tasks performed in a given order, the tasks may be performed in a different order, some tasks may be omitted, and other tasks may be added. Examples of the client device may include client device 205 of FIG. 2, client device 405 of FIG. 4, computing device 600 of FIG. 6, or the like. Examples of the sever device may include server device 210 of FIG. 2, server device 410 of FIG. 4, computing device 600 of FIG. 6, or the like.

The process 500 includes (at 505) responsive to receiving a first uptime identifier from a server device, transmitting, by a client device and via a socket, a probe packet to the server device. The probe packet may have a size and may include a request for an uptime identifier. In some examples, the first uptime identifier may indicate that the server device is contactable (e.g., that the server device is experiencing uptime and reachable via a network).

In some examples, the process 500 may further involve transmitting, by the client device and via the socket, a first probe packet (different from the probe packet) to the server device. The first probe packet may have a first size and may include an additional request for an uptime identifier. The process 500 may further involve receiving, by the client device and via the socket, a first response to the first probe packet from the server device, and the first response may include the first uptime identifier. In this regard, in some examples, the client device may transmit the first probe packet (and receive the first response having the first uptime identifier) prior to transmitting the probe packet. In some examples, the first size may be a minimum size of the MTU setting for the socket. The minimum size may be a size defined by a network protocol used to transmit the probe packet, such as 576 bytes for IPV4, 1280 bytes for IPV6, or the like. In this regard, the first probe packet may test the minimum MTU setting for the socket. As described herein, the client device may test the minimum MTU setting (e.g., perform an MTU test with the minimum MTU setting, as described at task 105 of FIG. 1) to verify that the server device is contactable and/or experiencing uptime.

In some examples, the process 500 the client device may transmit the first probe packet responsive to determining that a set of uptime identifiers received from the server device identify an interrupted uptime of the server device. In some examples, an uptime may be interrupted by a downtime. For instance, as described at task 145 of FIG. 1, responsive to determining that a set of uptime identifiers received from the server device do not match, the client device may verify that the server device is experiencing uptime by performing an MTU test with the minimum MTU setting.

In some examples, the process 500 may involve transmitting, by the client device, the probe packet further responsive to transmitting an additional probe packet and determining that the additional probe packet was not successfully received at the server device. The client device may transmit the additional probe packet to the server device via the socket. The additional probe packet may have an additional size, which may be greater than the size of the probe packet. In this regard, the client device may test multiple MTU settings. For instance, as described at tasks 125-140, the client device may test an MTU setting with a particular size, determine that the MTU test was not successful, change the size of the MTU setting to be tested, and may perform an MTU test with the changed MTU setting size.

In some examples, the additional size may be a maximum size for the MTU setting for the socket. The maximum size may be defined based on a capability of the client device, in some examples. In some examples, the client device may determine that the additional probe packet was not successfully received based on failing to receive an additional response to the additional probe packet, which may include failing to receive the additional response entirely or failing to receive the additional response within a timeout period.

In some examples, the client device may transmit the additional probe packet responsive to completing a handshake, such as a TCP handshake, a TLS handshake, or the like, with the server device. The client device may determine that the additional probe packet was not successfully received at the server device based on failing to complete the handshake with the server device, as described at task 220 of FIG. 2.

In some examples, the client device may transmit the probe packet responsive to setting the MTU setting of the socket to the size. Setting the MTU setting of the socket to the size may involve setting an MSS of the socket based on the size. In some examples, the client device may use a socket API to set the MSS.

In some examples, the probe packet includes a DF flag, and the client device may transmit the probe packet with the DF flag set to a first value so that packet fragmentation of the probe packet is permitted.

The process 500 includes (at 510) receiving, by the client device and via the socket, a response to the probe packet from the server device. The response may indicate that the probe packet was successfully received at the server device and may include a second uptime identifier.

The process 500 includes (at 515) storing, by the client device, the size as a maximum transmission unit (MTU) setting of the socket. The client device may store the size as the MTU setting of the socket responsive to determining that the first uptime identifier and the second uptime identifier identify an uninterrupted uptime of the server device.

The client device may determine that the first uptime identifier and the second uptime identifier identify an uninterrupted uptime of the server device based on a comparison of the first uptime identifier and the second uptime identifier, as described with respect to task 145 of FIG. 1, for example.

The process 500 includes (at 520) transmitting, by the client device and via the socket, a data packet to the server device using the MTU setting.

Figure 6:
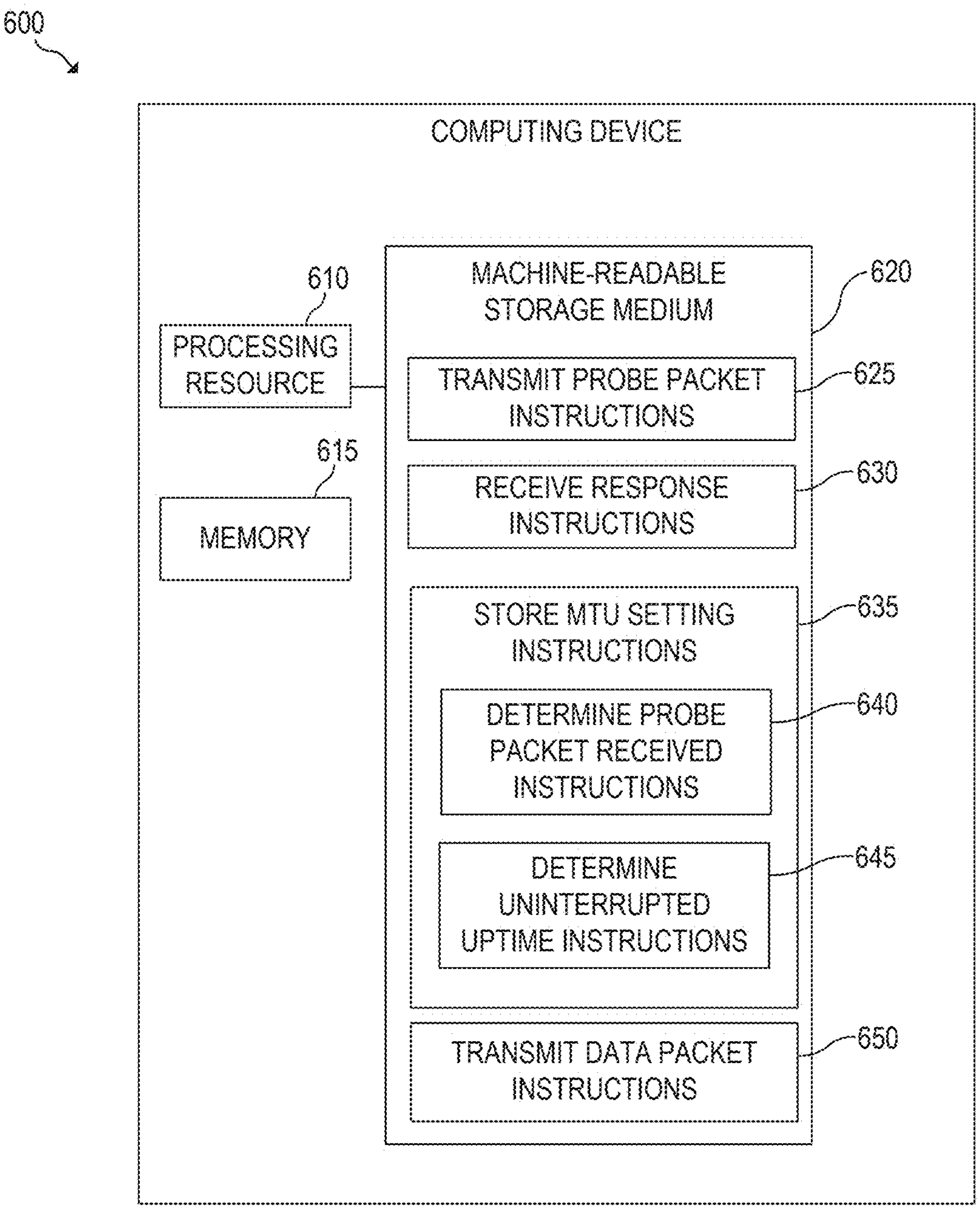
FIG. 6 is a block diagram of a computing device capable of discovering an MTU setting for a socket, according to some examples.

FIG. 6 is a block diagram of a computing device 600 capable of discovering an MTU setting for a socket associated with a connection between the computing device and a server device, according to some examples. The computing device 600 includes a processing resource 610, a memory 615, and a machine-readable storage medium 620 including instructions 625, 630, 635, 640, 645, and 650 (hereinafter collectively referred to as instructions 625-650) for discovering the MTU setting. The computing device 600 may be, for example, a server, client computer, notebook computer, a slate computing device, a portable reading device, a wireless email device, a mobile phone, or any other computing device. Further, computing device 600 may be an example of a client device described herein (e.g., client device 205 of FIG. 2, client device 405 of FIG. 4, or the like). In some examples, computing device 600 may be an example of a server device described herein (e.g., server device 210 of FIG. 2, server device 410 of FIG. 4, or the like). In this regard, while certain operations are described as being performed by a client device or a server device, operations may be performed by either the client device, the server device, or a combination thereof.

The transmit probe packet instructions 625 may be executable to, responsive to receiving a first uptime identifier from a server device, transmit, via a socket, a probe packet to the server device. The probe packet may have a size and may include a request for an uptime identifier.

In some examples, the machine-readable storage medium 620 may further include instructions executable to transmit a first probe packet (different from the probe packet) to the server device, where the first probe packet has a first size. The first size may be a default MTU setting size, which may be a predetermined size, as described with respect to task 305 of FIG. 3. In other examples, the first size may be a minimum size for the MTU setting. The instructions may further be executable to transmit a second probe packet responsive to determining that the first probe packet was not successfully received at the server device, as described with respect to tasks 310-325 of FIG. 3. In some examples, the instructions may be executable to transmit the second probe packet responsive to a predetermined delay following transmission of the first probe packet elapsing, as described with respect to task 115 of FIG. 1. The instructions may further be executable to receive a second response to the second probe packet from the server device. In some examples, the second response may include the first uptime identifier. In this regard, in some examples, the client device may transmit both the first probe packet and the second probe packet prior to transmitting the probe packet.

The receive response instructions 630 may be executable to receive, via the socket, a response to the probe packet from the server device. The response may include a second uptime identifier.

The store MTU setting instructions 635 may include the determine probe packet received instructions 640 and the determine uninterrupted uptime instructions 645. In some examples, the store MTU setting instructions 635 may be executable to store the size as an MTU setting of the socket responsive to executing the determine probe packet received instructions 640 and the determine uninterrupted uptime instructions 645. Storing the size as the MTU setting of the socket may involve storing the size in memory 615, which may be a cache, a memory, a storage, or the like. While illustrated separately, in some examples, the machine-readable storage medium 620 may include memory 615. Accordingly, storing the size as the MTU setting of the socket may involve storing the size in the machine-readable storage medium 620.

The determine probe packet received instructions 640 may be executable to determine that the probe packet was successfully received at the server device, and the determine uninterrupted uptime instructions 645 may be executable to determine that the first uptime identifier and the second uptime identifier identify an uninterrupted uptime of the server device.

In some examples, the determine probe packet received instructions 640 may be further executable to determine that the probe packet was successfully received at the server device based on a comparison of content of the probe packet and content of the response. For instance, the client device may compare a pattern of the probe packet with a pattern of the response. The client device may additionally or alternatively compare the content of the probe packet with content of the response to determine whether the server device overrode the entire content of the probe packet. The determine probe packet received instructions 640 may be further executable to determine that the probe packet was successfully received at the server device based on a comparison of the size and a size of the response.

The transmit data packet instructions 650 may be executable to transmit, via the socket, a data packet to the server device using the MTU setting.

Processing resource 610 can include a collection of hardware processors. A hardware processor can include a microprocessor, a core of a multi-core microprocessor, a microcontroller, a programmable integrated circuit, a programmable gate array, or another hardware processing circuit. Processing resource 610 may fetch, decode, and execute instructions 625-650 to discover the MTU setting. As an alternative or in addition to retrieving and executing instructions, processing resource 610 may include at least one integrated circuit (IC), other control logic, other electronic circuits, or combinations thereof that include a number of electronic components for performing the functionality of instructions 625-650.

As described in detail herein, machine-readable storage medium 620 may be encoded with a series of executable instructions, including instructions 625-650. Machine-readable storage medium 620 may be encoded with executable instructions to perform the operations of the process 100 described in FIG. 1, the process 200 described in FIG. 2, the process 300 described in FIG. 3, the process 500 described in FIG. 5, the instructions 705-725 described in FIG. 7, and/or any other operations performed by the client device or the server device, without limiting the scope of the present disclosure.

Figure 7:
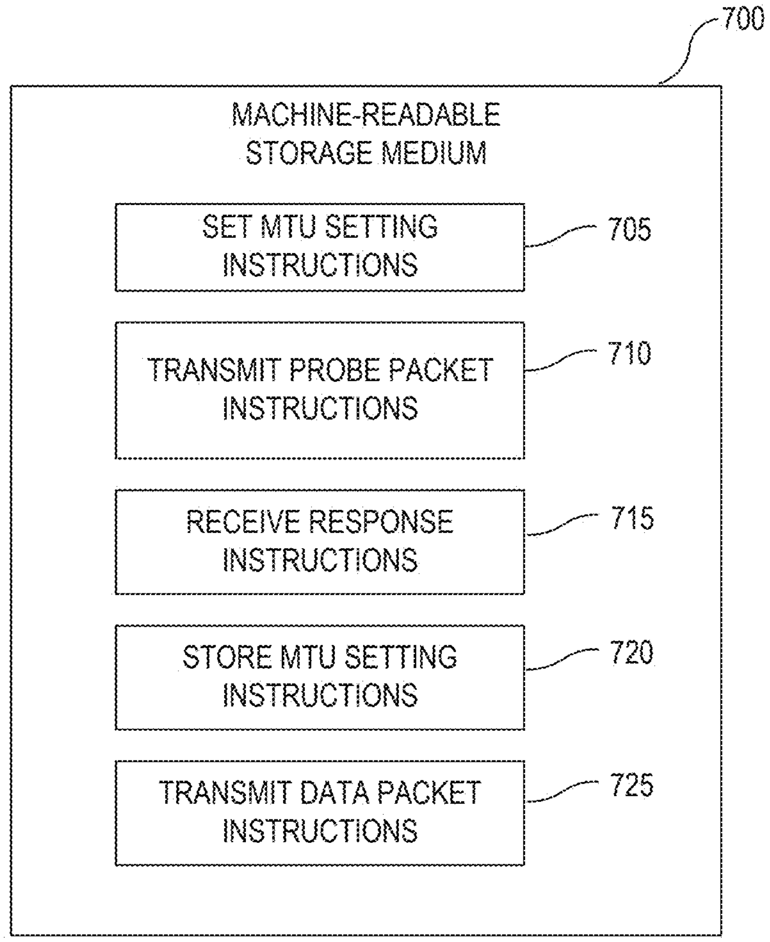
FIG. 7 is a block diagram of a machine-readable storage medium 700 having instructions for discovering an MTU setting for a socket, according to some examples.

FIG. 7 is a block diagram of a machine-readable storage medium 700 having instructions for discovering an MTU setting for a socket, according to some examples. The machine-readable storage medium 700 includes instructions 705, 710, 715, 720, and 725 (hereinafter collectively referred to as instructions 705-725). Machine-readable storage medium 700 may be included in and/or instructions 705-725 executed by a client device (e.g., client device 205 of FIG. 2, client device 405 of FIG. 4, computing device 600 of FIG. 6, or the like), as described herein.

The set MTU setting instructions 705 may be executable by at least one processing resource to, responsive to receiving a first uptime identifier from a server device, set a maximum transmission unit (MTU) setting of a socket to a size.

The transmit probe packet instructions 710 may be executable by the at least one processing resource to transmit, via the socket, a probe packet to the server device. The probe packet may have the size and may include a request for an uptime identifier.

In some examples, the transmit probe packet instructions 710 may be further executable to transmit the probe packet to the server over a network path associated with the socket. The network path may include a dynamic network address translation device and/or a virtual private network.

The receive response instructions 715 may be executable by the at least one processing resource to receive, via the socket, a response to the probe packet from the server device. The response may indicate that the probe packet was successfully received at the server device and may include a second uptime identifier.

The store MTU setting instructions 720 may be executable by the at least one processing resource to store the size as the MTU setting of the socket responsive to determining that the first uptime identifier and the second uptime identifier identify an uninterrupted uptime of the server device.

In some examples, the store MTU setting instructions 720 may be further executable to store the size as the MTU setting of the socket in a cache associated with the socket. Examples of the cache may include memory 615 of FIG. 6 and/or the machine-readable storage medium 700.

The transmit data packet instructions 725 may be executable by the at least one processing resource to transmit, via the socket, a data packet to the server device using the MTU setting.

As described in detail herein, machine-readable storage medium 700 may be encoded with a series of executable instructions, including instructions 705-725. Machine-readable storage medium 700 may be encoded with executable instructions to perform the operations of the process 100 described in FIG. 1, process 200 described in FIG. 2, the process 300 described in FIG. 3, and/or any other operations performed by a client device (e.g., client device 205 of FIG. 2, client device 405 of FIG. 4, computing device 600 of FIG. 6, or the like), without limiting the scope of the present disclosure.

A storage medium (e.g., 620 in FIG. 6 or 700 in FIG. 7) in which machine-readable instructions are stored can include any or some combination of the following: a semiconductor memory device such as a dynamic or static random access memory (a DRAM or SRAM), an erasable and programmable read-only memory (EPROM), an electrically erasable and programmable read-only memory (EEPROM), or a flash memory; a magnetic disk such as a fixed, floppy and removable disk; another magnetic medium including tape; an optical medium such as a compact disk (CD) or a digital video disk (DVD); or another type of storage device. As such, the machine-readable storage medium 620 (FIG. 6) and the machine-readable storage medium 700 (FIG. 7) can be non-transitory. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the terms "includes," "including," "comprises," "comprising," "have," or "having" when used in this disclosure specify the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method, comprising:

responsive to receiving a first uptime identifier from a server device, transmitting, by a client device and via a socket, a probe packet to the server device, the probe packet having a size and comprising a request for an uptime identifier;

receiving, by the client device and via the socket, a response to the probe packet from the server device, the response indicating that the probe packet was successfully received at the server device and comprising a second uptime identifier;

storing, by the client device, the size as a maximum transmission unit (MTU) setting of the socket responsive to determining that the first uptime identifier and the second uptime identifier identify an uninterrupted uptime of the server device; and transmitting, by the client device and via the socket, a data packet to the server device using the MTU setting.

2. The method of claim 1, further comprising:

transmitting, by the client device and via the socket, a first probe packet to the server device, the first probe packet having a first size and comprising an additional request for an uptime identifier; and receiving, by the client device and via the socket, a first response to the first probe packet from the server device, the first response comprising the first uptime identifier.

3. The method of claim 2, wherein the first size is a minimum size of the MTU setting for the socket.

4. The method of claim 2, further comprising:

transmitting, by the client device, the first probe packet responsive to determining that a set of uptime identifiers received from the server device identify an interrupted uptime of the server device.

5. The method of claim 1, comprising transmitting, by the client device, the probe packet further responsive to:

transmitting, by the client device and via the socket, an additional probe packet to the server device, the additional probe packet having an additional size greater than the size; and determining, by the client device, that the additional probe packet was not successfully received at the server device.

6. The method of claim 5, further comprising:

determining, by the client device, that the additional probe packet was not successfully received at the server device based on failing to receive an additional response to the additional probe packet.

7. The method of claim 5, further comprising:

transmitting, by the client device, the additional probe packet responsive to completing a handshake with the server device; and determining, by the client device, that the additional probe packet was not successfully received at the server device based on failing to complete the handshake with the server device.

8. The method of claim 5, wherein the additional size is a maximum size for the MTU setting for the socket.

9. The method of claim 1, further comprising:

transmitting, by the client device, the probe packet further responsive to setting the MTU setting of the socket to the size.

10. The method of claim 9, further comprising:

setting, by the client device, the MTU setting of the socket to the size based on setting a maximum segment size of the socket based on the size.

11. The method of claim 1, wherein the probe packet comprises a Don't Fragment (DF) flag, and wherein transmitting the probe packet comprises:

transmitting, by the client device, the probe packet with the DF flag set to a first value so that packet fragmentation of the probe packet is permitted.

12. A system comprising:

at least one processing resource; and a non-transitory machine-readable storage medium comprising instructions executable by the at least one processing resource to:

responsive to receiving a first uptime identifier from a server device, transmit, via a socket, a probe packet to the server device, the probe packet having a size and comprising a request for an uptime identifier;

receive, via the socket, a response to the probe packet from the server device, the response comprising a second uptime identifier;

store the size as a maximum transmission unit (MTU) setting of the socket responsive to:

determining that the probe packet was successfully received at the server device; and determining that the first uptime identifier and the second uptime identifier identify an uninterrupted uptime of the server device; and transmit, via the socket, a data packet to the server device using the MTU setting.

13. The system of claim 12, wherein the instructions are further executable to:

determine that the probe packet was successfully received at the server device based on one or more of:

a comparison of content of the probe packet and content of the response; and a comparison of the size and a size of the response.

14. The system of claim 12, wherein the instructions are further executable to:

transmit a first probe packet having a first size to the server device;

transmit a second probe packet responsive to determining that the first probe packet was not successfully received at the server device; and receive a second response to the second probe packet from the server device, the second response comprising the first uptime identifier.

15. The system of claim 14, wherein the first size is a default MTU setting size.

16. The system of claim 14, wherein the instructions are further executable to:

transmit the second probe packet responsive to a predetermined delay following transmission of the first probe packet elapsing.

17. A non-transitory machine-readable storage medium comprising instructions executable by at least one processing resource of a computing device to:

responsive to receiving a first uptime identifier from a server device, set a maximum transmission unit (MTU) setting of a socket to a size;

transmit, via the socket, a probe packet to the server device, the probe packet having the size and comprising a request for an uptime identifier;

receive, via the socket, a response to the probe packet from the server device, the response indicating that the probe packet was successfully received at the server device and comprising a second uptime identifier;

store the size as the MTU setting of the socket responsive to determining that the first uptime identifier and the second uptime identifier identify an uninterrupted uptime of the server device; and transmit, via the socket, a data packet to the server device using the MTU setting.

18. The non-transitory machine-readable storage medium of claim 17, wherein the instructions are further executable to:

store the size as the MTU setting of the socket in a cache associated with the socket.

19. The non-transitory machine-readable storage medium of claim 17, wherein the instructions are further executable to:

transmit the probe packet to the server over a network path associated with the socket, the network path comprising a dynamic network address translation device.

20. The non-transitory machine-readable storage medium of claim 17 wherein the instructions are further executable to:

transmit the probe packet to the server over a network path associated with the socket, the network path comprising a virtual private network.

* * * * *